(12) United States Patent
Wu et al.

(10) Patent No.: US 7,424,744 B1
(45) Date of Patent: Sep. 9, 2008

(54) SIGNATURE BASED NETWORK INTRUSION DETECTION SYSTEM AND METHOD

(75) Inventors: Handong Wu, Los Angeles, CA (US); Stephen Schwab, Manhattan Beach, CA (US); Robert Lom Peckham, Los Angeles, CA (US)

(73) Assignee: McAfee, Inc., Santa Clara, CA (US)

( * ) Notice: Subject to any disclaimer, the term of this patent is extended or adjusted under 35 U.S.C. 154(b) by 787 days.

(21) Appl. No.: 10/092,179

(22) Filed: Mar. 5, 2002

(51) Int. Cl.
*G06F 11/00* (2006.01)

(52) U.S. Cl. .................... 726/23; 726/22; 726/24; 713/153; 713/154; 713/164; 713/165; 713/166; 713/188; 709/223; 370/392

(58) Field of Classification Search .............. 726/22, 726/23; 709/224, 223; 713/153, 154, 164, 713/165, 166, 188; 370/392
See application file for complete search history.

(56) References Cited

U.S. PATENT DOCUMENTS

| | | | |
|---|---|---|---|
| 4,714,992 A | 12/1987 | Gladney et al. | |
| 5,414,712 A | 5/1995 | Kaplan et al. | 371/15.1 |
| 5,751,698 A | 5/1998 | Cushman et al. | 370/252 |
| 6,195,352 B1 | 2/2001 | Cushman et al. | 370/395 |
| 6,219,706 B1* | 4/2001 | Fan et al. | 709/225 |
| 6,279,113 B1* | 8/2001 | Vaidya | 726/23 |
| 6,567,408 B1* | 5/2003 | Li et al. | 370/395.31 |
| 6,633,860 B1* | 10/2003 | Afek et al. | 706/45 |
| 6,651,099 B1* | 11/2003 | Dietz et al. | 709/224 |
| 6,925,085 B1* | 8/2005 | Krishna et al. | 370/395.32 |
| 6,928,549 B2* | 8/2005 | Brock et al. | 713/194 |
| 6,970,462 B1* | 11/2005 | McRae | 370/392 |
| 7,079,539 B2* | 7/2006 | Calle et al. | 370/392 |
| 7,143,442 B2* | 11/2006 | Scarfe et al. | 726/23 |
| 7,154,888 B1* | 12/2006 | Li et al. | 370/389 |
| 2002/0144156 A1* | 10/2002 | Copeland, III | 713/201 |
| 2003/0123452 A1* | 7/2003 | Cox et al. | 370/395.43 |

OTHER PUBLICATIONS

Roesch, Martin, "Snort-Lightweight Intrusion Detection for Networks", Nov. 1999.

* cited by examiner

*Primary Examiner*—Hosuk Song
*Assistant Examiner*—Beemnet W Dada
(74) *Attorney, Agent, or Firm*—Zilka-Kotab, PC; Christopher J. Hamaty

(57) ABSTRACT

A signature based intrusion detection method and system are disclosed. A method for detecting intrusions on a network generally comprises storing signature profiles identifying patterns associated with network intrusions in a signature database and generating classification rules based on the signature profiles. Data packets transmitted on the network and having corresponding classification rules are classified according to generated classification rules. Classified packets are forwarded to a signature engine for comparison with signature profiles.

32 Claims, 7 Drawing Sheets

SIGNATURE BASED NETWORK INTRUSION DETECTION SYSTEM AND METHOD

BACKGROUND OF THE INVENTION

The present invention relates generally to communication systems, and more particularly, to a signature based network intrusion detection system and method.

The explosion of the Internet allows companies and individuals real time access to vast amounts of information. As Internet access costs have decreased, corporations are increasingly using the Internet for corporate data and communications. The many advantages of the Internet, such as cost and flexibility are heavily impacted by security risks. Security is increasingly becoming a critical issue in enterprise and service-provider networks as usage of public networks for data transport increases and new business applications such as e-commerce sites are deployed. Security measures are required, for example, to prevent hackers from gaining unauthorized access to a corporations information resources or shutting down an e-commerce web site via a distributed denial of service attack. Corporations continue to deploy firewalls to prevent unauthorized users from entering their networks. However, corporations are looking to additional security technologies to protect their system's vulnerability that firewalls alone cannot address.

One of these additional security measures is an intrusion detection system (IDS). As network attacks have increased in number and severity, intrusion detection systems have become a necessary addition to the security infrastructure of most organizations. Intrusion detection allows organizations to protect their systems from threats that come with increasing network connectivity and reliance on information systems. Intrusion detection systems include software or hardware systems that automate the process of monitoring events occurring in a computer system or network, and analyzing them for signs of security problems. Intruders attempt to compromise the confidentiality, integrity, availability, or to bypass the security mechanisms of a computer or network. These include, for example, unauthorized users, authorized users of the systems who attempt to gain additional privileges for which they are not authorized, and authorized users who misuse the privileges given to them. Intrusion detection technology is therefore, a necessary addition to every large organization's computer network security infrastructure.

Network based intrusion detection systems (NIDSs) provide network surveillance by analyzing packet data streams within the network, searching for unauthorized activity, such as attacks by hackers, and enabling users to respond to security breaches before systems are compromised. Typically, network intrusion detection systems analyze individual packets flowing through a network and can detect malicious packets that are designed to be overlooked by a firewall's simplistic filtering rules. Network intrusion detection systems may also be configured to look at the payload within a packet to see which particular web server program is being accessed and with what options, and to raise alerts when an attacker tries to exploit a bug in such code. When unauthorized activity is detected, the intrusion detection system can send alarms to a management console or system administrator with details of the activity and may also direct other systems to cut off the unauthorized sessions.

Network intrusion detection systems may be signature based, anomaly based, or a combination of both. The signature based intrusion detection system analyzes information it gathers and compares it to a large database of attack signatures. The system looks for a specific attack that has already been documented. In the anomaly based system, a system administrator defines the baseline, or normal state of the network's traffic load, breakdown, protocol, and typical packet size. The anomaly detector monitors network segments to compare their state to the normal baseline and look for anomalies. Conventional network intrusion detection devices are challenged with accurately detecting various intrusions hidden in ever increasing high-speed network traffic packets, either via intrusion signature matching or network traffic anomaly discovery approaches.

Conventional signature based network intrusion detection systems treat signatures as passive items. When a packet is inspected, it is matched against a list of signatures. Since a signature database often contains hundreds or thousands of signatures, it is impossible to match the signatures against every packet in real-time in order to detect all potential threats in high-speed network systems.

Furthermore, conventional packet classification techniques are not well suited for handling the diverse nature of intrusion signatures. Signature based intrusion detection systems such as Snort programs are typically configured with a set of rules to detect popular attack patterns. Signature detection systems go one step beyond packet filters in complexity by searching for an arbitrary string that can appear anywhere in the packet payload. Systems such as Snort examine one rule at a time. Each time a rule matches, Snort does a fast string search on the associated pattern using the Boyer-Moore algorithm. While the Boyer-Moore algorithm is very fast for a single string search, a single packet can match several rules with patterns, resulting in many Boyer-Moore searches. Thus, this technique does not scale with increasing rule sizes.

There is, therefore, a need for a system and method for reducing the amount of processing required for packet inspection to provide efficient signature based intrusion detection for high-speed networks.

SUMMARY OF THE INVENTION

A signature based intrusion detection method and system are disclosed. A method for detecting intrusions on a network generally comprises storing signature profiles identifying patterns associated with network intrusions in a signature database and generating classification rules based on the signature profiles. Data packets transmitted on the network and having corresponding classification rules are classified according to generated classification rules. Classified packets are forwarded to a signature engine for comparison with signature profiles.

An intrusion detection system of the present invention generally comprises a signature classifier having a first stage classifier operable to classify packets according to at least one packet field into groups and a second stage classifier operable to classify the packets within each of the groups according to packet type or size. A signature database is provided for storing signature profiles identifying patterns associated with network intrusions. The system further includes a flow table configured to support table lookups of actions associated with classified packets and a signature engine operable to perform a table lookup at the flow table to select an action to be performed on the packet based on its classification. One of the actions is comparing the packets to at least a subset of the signature profiles.

In another aspect of the invention, a computer program product for detecting intrusions on a network generally comprises code that stores signature profiles identifying patterns associated with network intrusions in a signature database, code that generates classification rules based on the signature profiles, code that receives packets transmitted on the network, code that classifies the packets according to at least one packet field into groups, code that classifies the packets within each of the groups according to packet type or size, and code that performs a table lookup to select an action to be performed on the packet based on its classification. One of the actions is comparing the packets to at least a subset of the signature profiles. A computer-readable storage medium is provided for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
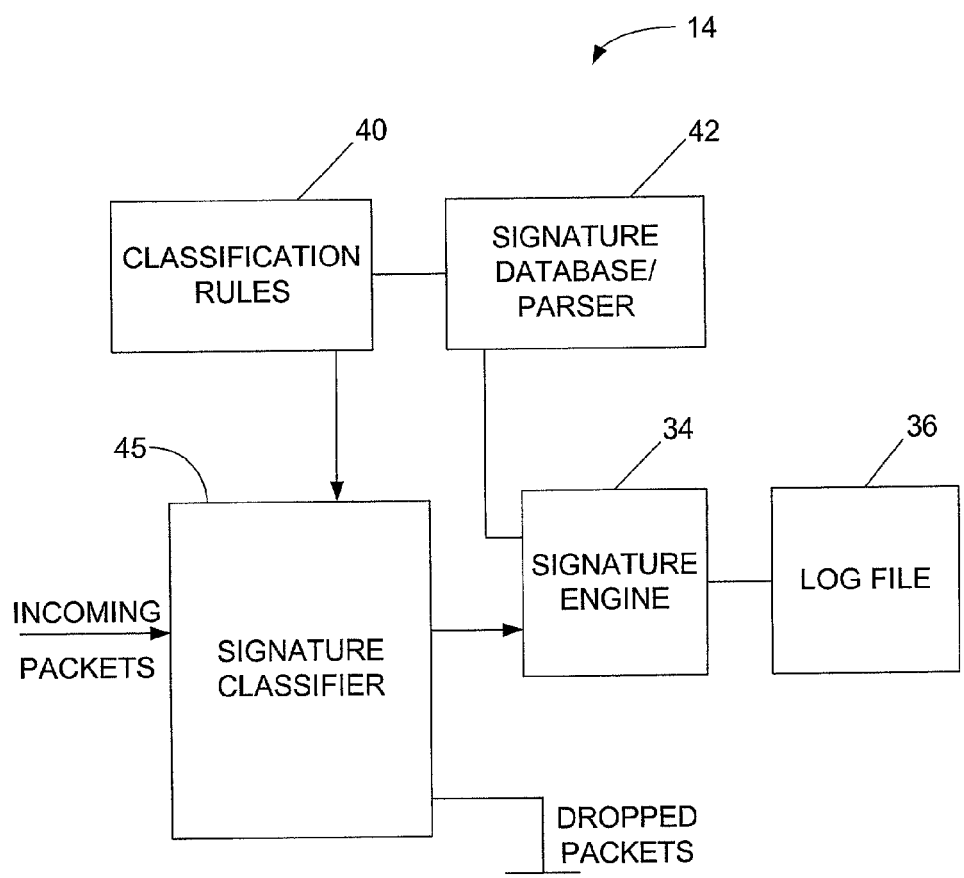
FIG. 1 is a block diagram illustrating a signature based intrusion detection system of the present invention.

Referring now to the drawings, and first to FIG. 1, a signature based intrusion detection system of the present invention is shown and generally indicated at 14. As described in detail below, signature based intrusion detection system 18 uses classification techniques to reduce the number of signatures to be tested for a match, as well as the number of packets that must be examined. The system includes a signature engine 34, classification rules database 40, signature database/parser 42, log file 36 and signature classifier 45. The signature classifier 45 filters out incoming packet streams in accordance with classification rules generated from the signature database 42. Only packets matched with the classification rules move to the signature engine 34, while no further processing is performed on the rest of packets. The workload of the signature engine 34 is thus reduced. As further described below, the output of the signature classifier 45 may be stored in a flow table and later processed by the signature engine 34. Alternatively, the result may be fed directly to the signature engine.

Figure 2:
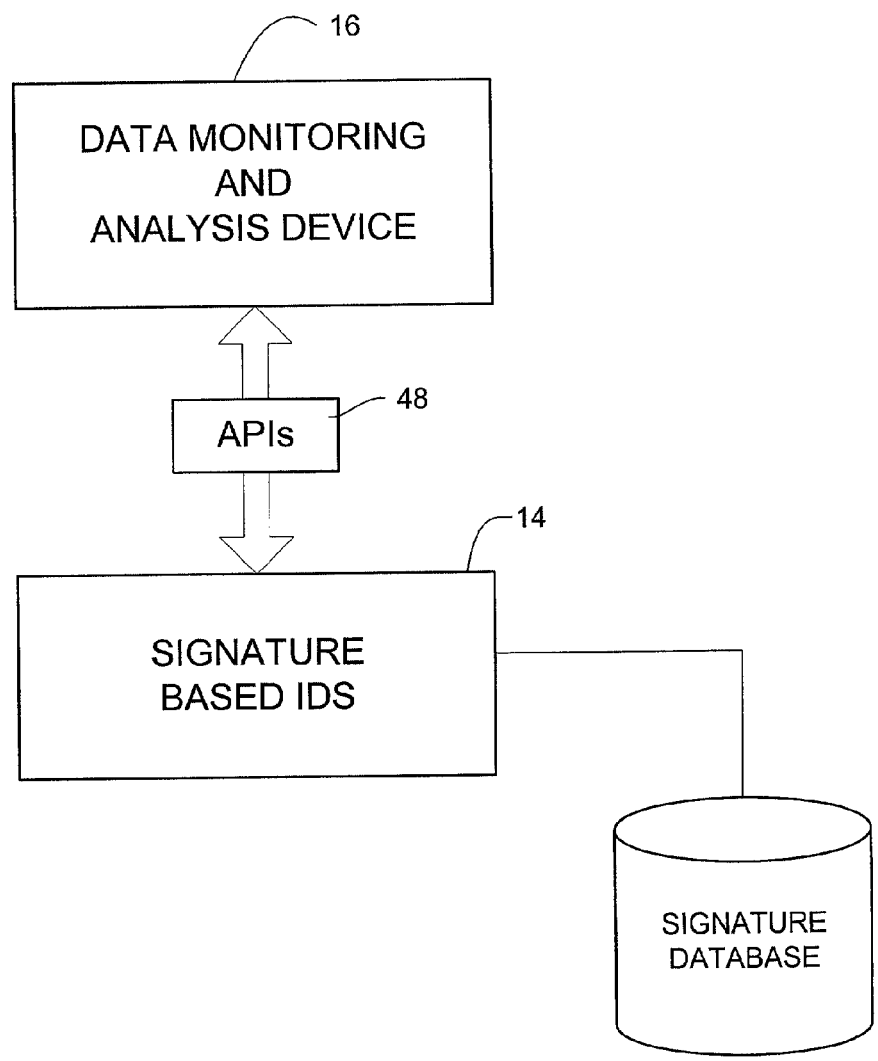
FIG. 2 is a block diagram illustrating the signature based intrusion detection system of FIG. 1 coupled with a network analysis device.

The signature based intrusion detection system 14 may be used alone or in combination with a data monitoring and analysis device configured to perform fault and network performance management as shown in FIG. 2. The network analysis device is configured to provide network monitoring, protocol decoding, and analysis capabilities. The network analysis device 16 may be, for example, a system such as SNIFFER™, available from Sniffer Technologies, a Network Associates Company. The combination of an intrusion detection device 14 and a network analysis device 16 allows for efficient detection of intrusions in high-speed network traffic since the functionality of system components can be used to perform dual simultaneous functions. The system performs packet capturing, protocol decoding, signature matching, and alert/alarm generation and report or any combination thereof, as described below. Functions such as packet capturing, protocol decoding, network statistics gathering, network traffic diagnosis, and alert/alarm generation and reporting are provided by the network analysis device 16. These applications are leveraged by the intrusion detection system 14 to provide an efficient network intrusion detection system which may be provided in combination with network analysis and management. Application program interfaces (APIs) may be provided to open applications of the network analysis device 16 (FIG. 1). The APIs are used to parse, generate and load signatures, invoke corresponding signature detection methods from appropriate protocol contexts, access states required for stateful intrusion detection, and access alerts/alarms management facilities.

It is to be understood, however, that the signature based intrusion detection system 14 described below may be used without the network analysis device 16, without departing from the scope of the invention. In this case, certain attributes of the analysis device 16, such as packet decoding, would be incorporated within the intrusion detection device 14.

Figure 3:
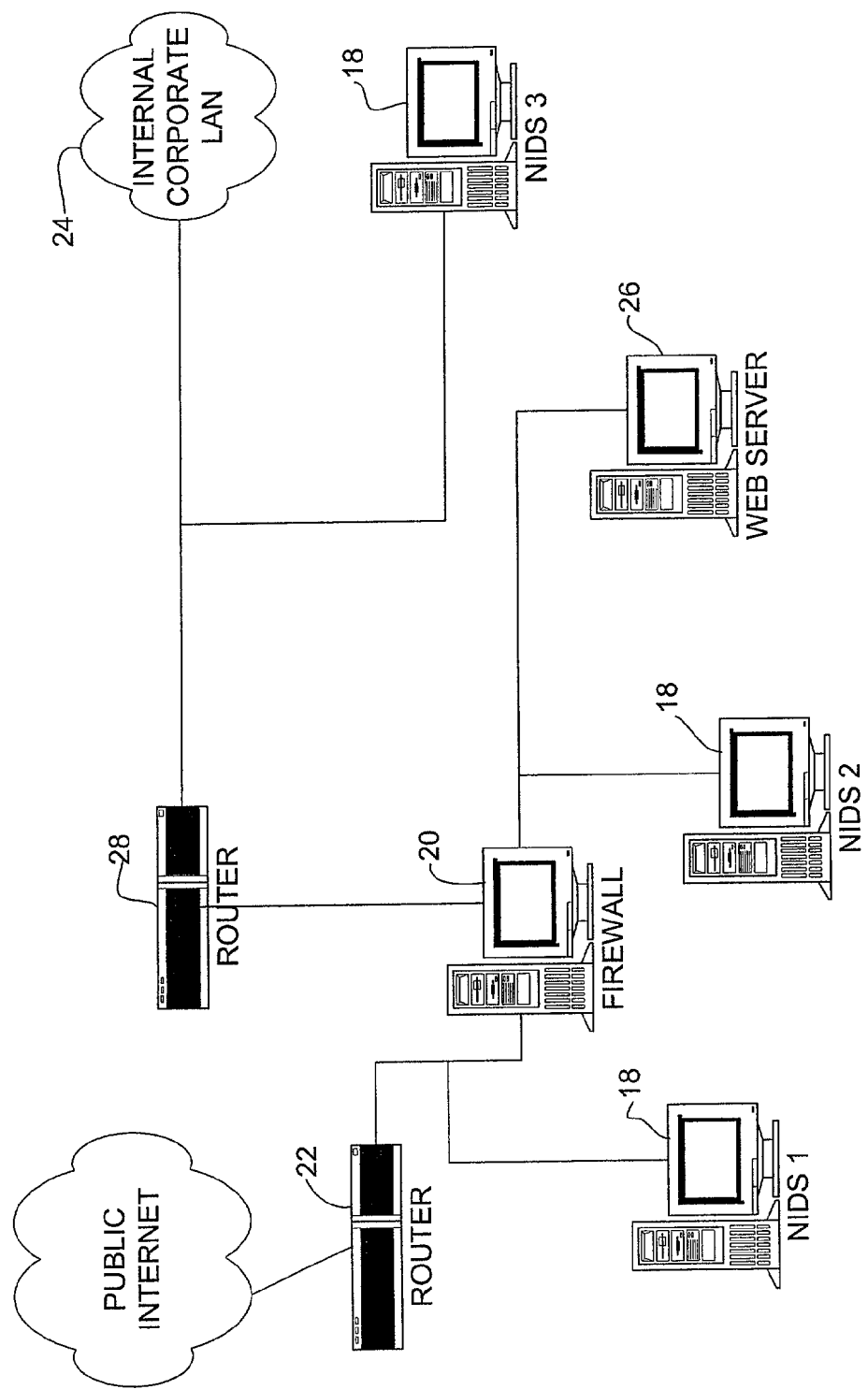
FIG. 3 is a diagram illustrating an example of network system containing intrusion detection systems of the present invention.

The present invention operates in the context of a data communication network including multiple network elements. The network may be wireless, frame relay, T1 links, Gigabit Ethernet Local Area Networks (LANs), packet over SONET, Wide Area Networks (WANs), or Asynchronous Transfer Mode (ATM), for example. FIG. 3 illustrates an exemplary network incorporating intrusion detection and analysis systems 18 of the present invention. The network intrusion detection system (NIDS) 18 may be placed at key points throughout the network. The units monitor network traffic, perform local analysis of the traffic, and report attacks to a central management station (e.g., system administrator). The network intrusion detection systems 18 are preferably placed on the network perimeter including both sides of a firewall 20 (e.g., between router 22 and the Internet), near a web server 26, and on links to internal or partner networks (e.g., between router 28 and internal corporate network 24). For example, NIDS 1 monitors all traffic passing into and out of the internal network. NIDS 1 provides an early warning since it detects reconnaissance port scans that typically indicate the start of hacker activity. From this point, NIDS 1 can document the number and types of attacks originating on the Internet that target the network. NIDS 2 monitors traffic that has passed through the firewall 20. NIDS 3 monitors traffic passing into and out of internal corporate LAN 24. It is to be understood that the network of FIG. 3 is only one example illustrating placement of NIDSs within a network and that the present invention may be used on different types of networks and placed in various locations throughout the network. Furthermore, it is to be understood that the system of the present invention may also be used in networks which are not connected to the Internet and may be used, for example, in intranets or any other type of network.

An initialization routine is used to parse the signatures and detection rules and set up other internal data structures. The signatures are provided to the parser which generates code to be used by signature engine 34 (FIG. 1). The signature engine 34 analyzes the packets to see if there is an intrusion embedded in the packet. Information on detected intrusions is sent to the log file 36, which is available, for example, to a system administrator. The log file 36 may also include an application that generates alarms for the system administrator. The log file 36 may generate routine reports and other detailed information. A report may contain, for example, system events and intrusions detected over a reporting period. The system may use both active and passive measures when an intrusion is detected. Active measures may involve some automated intervention on part of the system. The passive measures involve reporting intrusion detection system findings to a system administrator or other personnel, who can then take action based on the reports.

Signatures (or patterns) of all known attacks are described in an abstract form and included within the signature database 42. These patterns are used to identify an intrusion. Additional signatures are identified by studying system audit information in order to find matching patterns of known system intrusions. In a similar manner indications of other attacks can be figured out. They are represented in a specified form and coded to the intrusion detection system. A signature analysis or pattern matching algorithm is used upon the packets, wherein the packets are compared to "attack signatures", or signatures of known policy violations or patterns of misuse. Signature engine 34 compares monitored traffic with attack signatures. Attack signatures can comprise, for example, a rules-based hierarchy of traffic signatures of known policy violations. The signature engine 34 compares packets from the network traffic with such attack signatures such that policy violations can be discovered.

Figure 4:
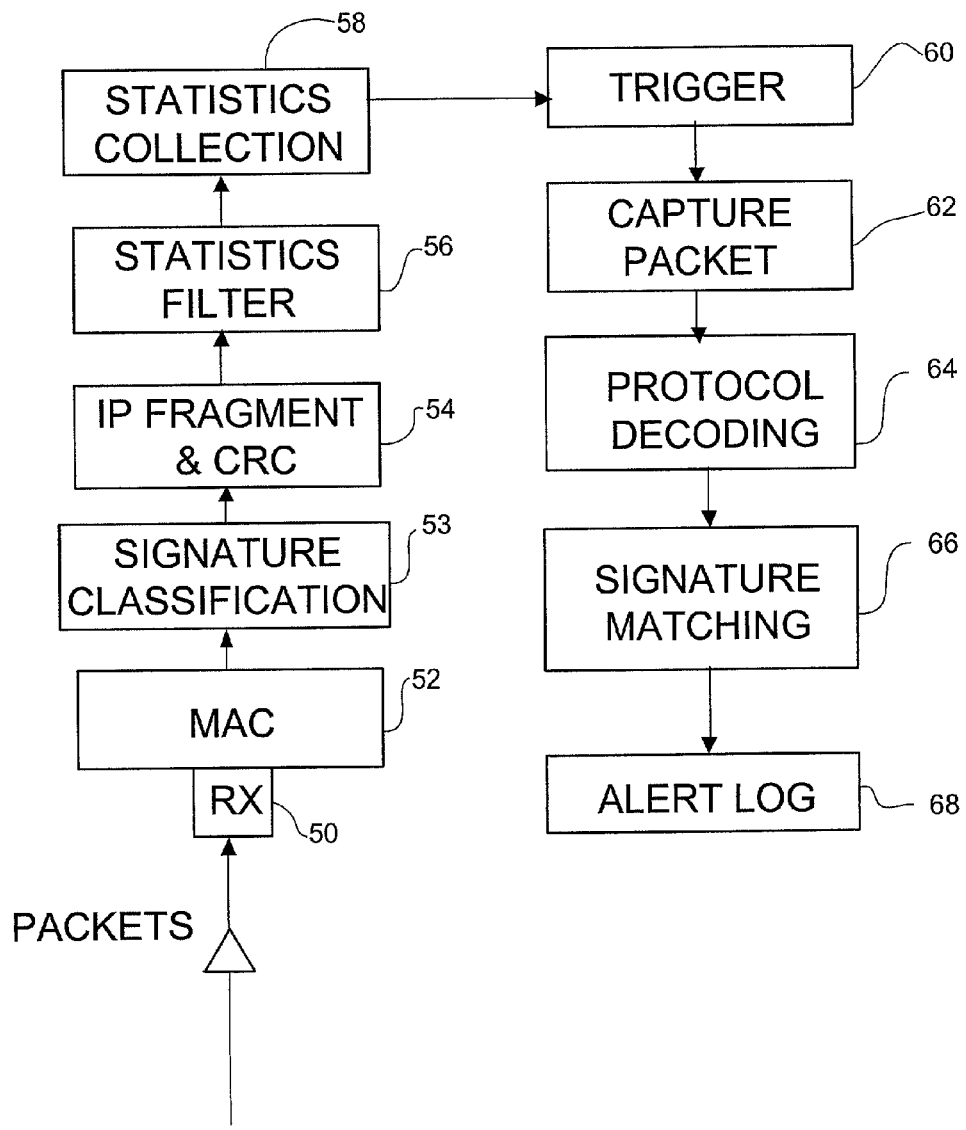
FIG. 4 is an example of a packet flow diagram for the detection system of FIG. 2.

FIG. 4 illustrates packet flow through the network intrusion detection and analysis system 18. The system preferably receives raw network packets and uses a network adaptor that listens and analyzes all traffic in real-time as it travels across the network. The packets are received at receiving port (RX) 50 at the MAC (Medium Access Control) layer 52. The packets then pass through IP fragment and CRC (Cyclic Redundancy Checking) 54. Signature classification is first performed at 53 to reduce the workload of the signature engine 34 during signature matching. A statistics filter 56 may also be used to filter out unwanted packets. The filter 56 determines which data to examine more closely and screens out all other network traffic. Filter 56 improves system performance by allowing known nonmalicious traffic to be filtered out. Network statistics are then collected at a statistics collection application 58. A trigger 60 is used to trigger the capture engine 32 to capture packets at 62. The packets are either analyzed in real time or temporarily stored for later analysis. Data may be captured, for example, at a buffer at the full-line rate for a short duration, with subsequent analysis of the buffered data at a slower pace. Protocol decoding 64 is provided to decode a wide range of protocols covering all of the Open System Interconnection (OSI) layers to provide detailed data and analysis. Detailed decoding allows visibility into the network regardless of the speed or topology. The packets may be grouped into different protocol presentations and the packets assembled into high level protocol groups for analysis. Signature matching 66 is performed based on packet classifications to detect network intrusion. Any problems detected are sent to an alert log 68 and appropriate action is taken.

Figure 5:
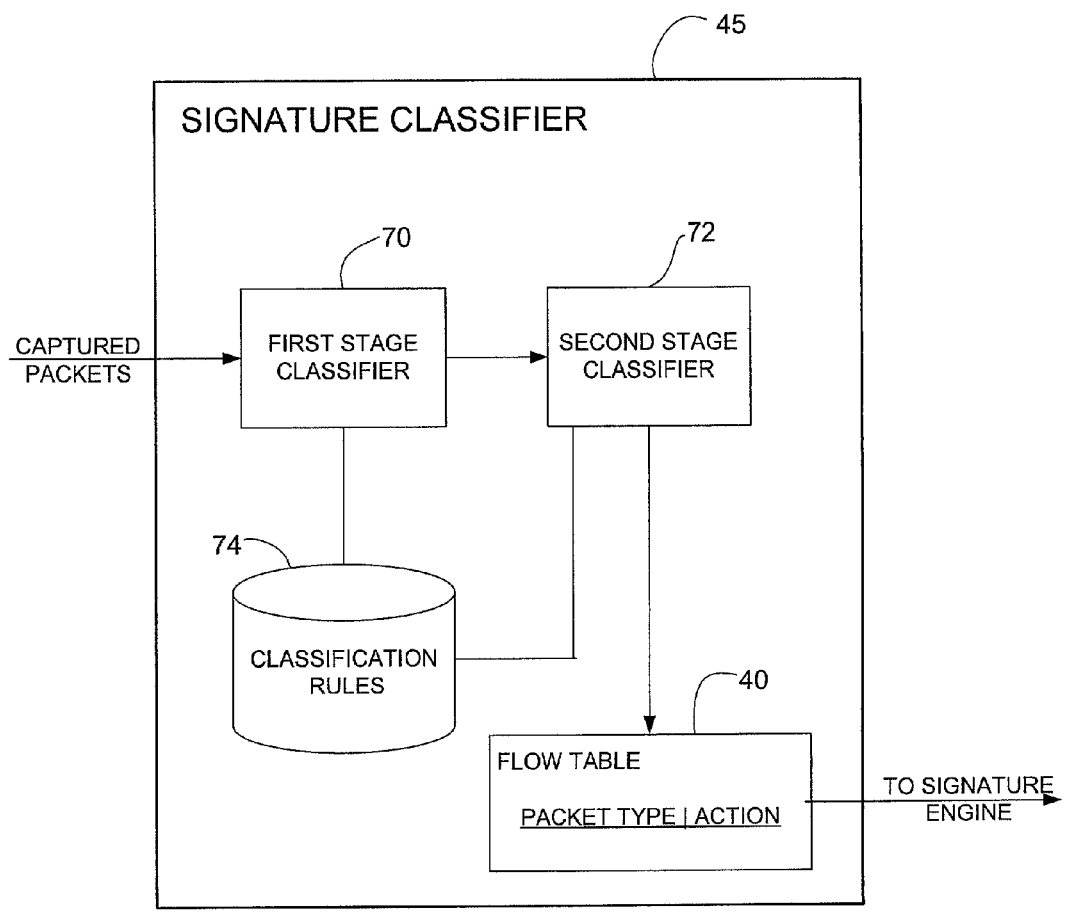
FIG. 5 is a block diagram of a signature classifier of the intrusion detection system of FIG. 1.

FIG. 5 is a block diagram illustrating details of the signature classifier 45 of the intrusion detection system. The signature classifier 45 includes a first stage classifier 70, second stage classifier 72, flow table 74, and classification rules database 40. The classification rules are generated based on the type of signature entries in the signature database. The classification rules are driven from the signature database so that it will only deal with the flows that will be examined by the active signatures stored in the database. The classification rules may have the following format, for example:

Flow-identity ->Action
Flow-identity:
    <prototype type>
    <source ip address>
    <destination ip address>
    <source ip address, destination ip address>
    <source ip address, range of dest ip addresses>
    <range of source ip addresses, destination ip address>
    <range of source ip addresses, range of destination ip addresses>
    <source port number>
    <destination port number>
Action:
[pass to signature engine]
[drop]

The following is an example for a SNORT type signature:
    alter tcp any-source-ip-address any-source-port->192.5.49.200 80

The resulting classification rule is:
    <destination-ip address=192.5.49.200, destination-port-number=80,
    tcp>[pass to signature engine]

Similar signatures may be combined to generate a single classification rule.

The signature classifier 45 groups packets into separate flows (e.g., TCP, UDP, or HTTP). Each identified flow may be handled differently by the signature engine to speed up the process. The signature classifier may be constructed with single or multiple stages. The signature classifier 45 shown in FIG. 5 performs a multi-stage classification process. The first stage of classification is based on a selected set of packet fields, such as destination address, protocol type, and destination port number. The second classification stage may be based on packet type or size (e.g., TCP flags or packet length). The table 74 supports efficient table lookups of appropriate actions associated with incoming packets. When a packet is captured and classified, the appropriate entry of the flow table 74 is retrieved in order to perform the associated action. The action options may include, for example, match the packet against a given subset of signatures, drop the packet, generate an alert, or drop the packet and update one or more fields of the flow table 74. As a default, all unclassified packets are dropped. It is to be understood that the flow table 74 may include different action options without departing from the scope of the invention. The flow table 74 may be implemented as one or more hash tables or other suitable data structures.

The signature engine 34 is responsible for identifying any intrusion embedded in the incoming packets selected by the signature classifier 45. The signature engine 34 preferably uses a priority scheme to ensure that a small set of signatures are checked when the system is overloaded with a large number of incoming packets. This allows the system administrator or security officer to identify and catch the most serious attacks.

Figure 6:
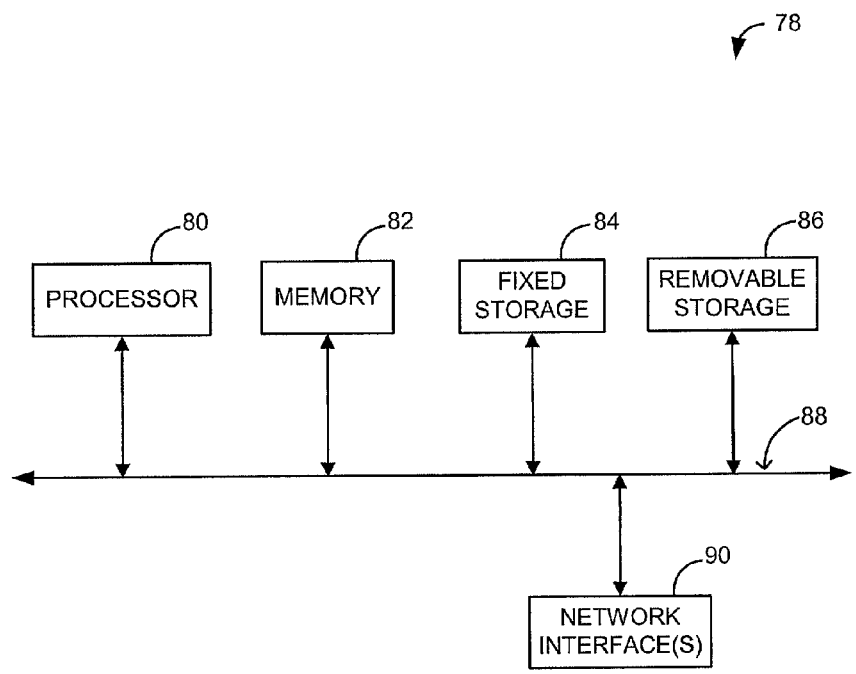
FIG. 6 is a diagram illustrating a computer system that may be used to execute software of this invention.

FIG. 6 is a system block diagram of a computer system, generally indicated at 78, that may be used within the network to execute software of an embodiment of the invention. The computer system may include subsystems such as a central processor 80, system memory 82, removable storage 86 (e.g., CD-ROM drive), and a hard drive 84 which can be utilized to store and retrieve software programs incorporating computer code that implements aspects of the invention, data for use with the invention, and the like. The computer readable storage may also include tape, flash memory, or system memory. Additionally, a data signal embodied in a carrier wave (e.g., in a network including the Internet) may be the computer readable storage medium. The computer system 78 may further include a display screen, keyboard, and mouse which may include one or more buttons for interacting with a GUI (Graphical User Interface). Other computer systems suitable for use with the invention may include additional or fewer subsystems. For example, the computer system 78 may include more than one processor 80 (i.e., a multi-processor system) or a cache memory.

The system bus architecture of the computer system 78 is represented by arrows 88 in FIG. 6. However, these arrows are only illustrative of one possible interconnection scheme serving to link the subsystems. For example, a local bus may be utilized to connect the central processor 80 to the system memory 82. The components shown and described herein are those typically found in most general and special purpose computers and are intended to be representative of this broad category of data processors. The computer system 78 shown in FIG. 6 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces 90, for example. The inside interface may be connected to a private network, while the outside interface may be connected to an external network such as the Internet. Preferably, each of these interfaces includes a plurality of ports appropriate for communication with the appropriate media, and associated logic, and in some instances memory.

Figure 7:
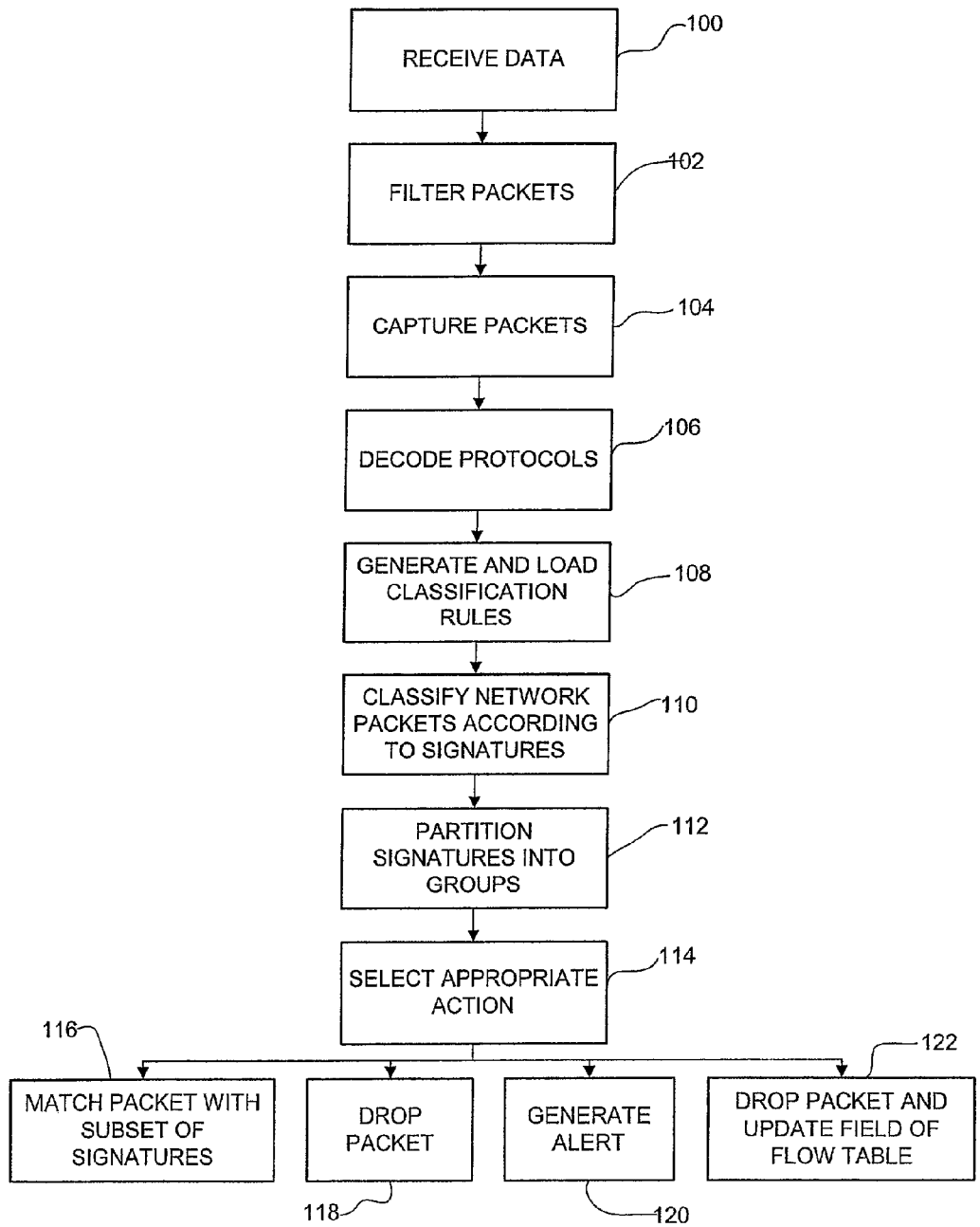
FIG. 7 is a flowchart illustrating a signature based intrusion detection process of the present invention.

FIG. 7 is a flowchart illustrating a process of the present invention for performing signature based intrusion detection. The packets are first received at the intrusion detection system at step 100 and filtered at step 102. Remaining packets are captured by the capture engine at step 104. The protocols are decoded at step 106. The classification rules are generated and loaded at step 108. The packets are then classified by the first and second stage classifiers 70, 72 to prepare them for signature matching (step 110). The signatures are partitioned into disjoint groups and each packet is analyzed (step 112). For example, all TCP flows may be separated from UDP flows, and HTTP flows may be separated from SMTP flows. After signature matching is performed, appropriate action is selected for each packet (step 114). Action may include, for example, match packet with subset of signatures (step 116), drop packet (step 118), generate alarm (120), or drop packet and update field of flow table (step 122).

As can be observed from the foregoing, the system and method of the present invention provide numerous advantages. The classification system of the present invention reduces the amount of work required for packet inspection. The system and method of the present invention reduces downtime caused by undetected attacks, resulting in greater availability of systems to conduct internal operations and complete transactions over the Internet or other communication network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A computer-implemented method for execution with computer code embodied on a tangible computer readable medium for detecting intrusions on a network, comprising:
    storing signature profiles identifying patterns associated with network intrusions in a signature database;
    generating classification rules based on said signature profiles;
    receiving data packets transmitted on the network;
    classifying data packets having corresponding classification rules according to said generated classification rules;
    forwarding said classified packets to a signature engine for comparison with signature profiles; and
    performing a table lookup to select an action to be performed on said classified packets based on the classification;
    wherein the classification is carried out by a first classification stage capable of classifying the data packets based on a first set of packet characteristics, and a second classification stage capable of classifying the data packets received from the first classification stage based on a second set of packet characteristics;
    wherein one of the actions is comparing said classified packets to at least a subset of the signature profiles;
    wherein the first set of packet characteristics on which the classification of the first classification stage is based includes at least one of a destination address, a protocol type, and a destination port number;
    wherein the second set of packet characteristics on which the classification of the second classification stage is based includes at least one of a packet type and a size;
    wherein classifying said data packets comprises classifying said data packets according to at least one packet field into groups, and classifying said data packets within each of the groups according to TCP flags;
    wherein the second classification stage remains in communication with a flow table for identifying an action to be taken with respect to the data packets;
    wherein the action identified utilizing the flow table includes dropping at least one of the data packets and updating one or more fields in the flow table:
    wherein the first classification stage precedes the second classification stage.

2. The method of claim 1 further comprising dropping data packets without corresponding classification rules.

3. The method of claim 1 further comprising classifying said data packets within each of the groups according to packet length.

4. The method of claim 1 wherein classifying said data packets according to the at least one packet field comprises classifying said data packets according to protocol type.

5. The method of claim 1 wherein classifying said data packets according to the at least one packet field comprises classifying said data packets according to destination port number.

6. The method of claim 1 wherein classifying said data packets according to the at least one packet field comprises classifying said data packets according to destination address.

7. The method of claim 1 wherein one of the actions of the table is dropping the at least one of the data packets.

8. The method of claim 1 further comprising generating an alert following the table lookup.

9. The method of claim 1 wherein the table lookup is performed in the flow table and further comprising updating a field of the flow table.

10. The method of claim 1 further comprising partitioning signatures into disjoint groups to define subsets of signature profiles.

11. The method of claim 10 further comprising comparing said data packets to at least one of the subsets of signature profiles.

12. The method of claim 1 further comprising filtering said received data packets.

13. The method of claim 1 wherein receiving said data packets comprises capturing said data packets at a network analysis device.

14. The method of claim 13 further comprising decoding protocols after receiving said packets.

15. An intrusion detection system including a tangible computer readable medium comprising:
a signature classifier comprising a first stage classifier operable to classify packets according to at least one packet field into groups during a first classification stage, and a second stage classifier operable to classify said packets within each of the groups according to TCP flags during a second classification stage;
a flow table configured to support table lookups of actions associated with classified packets;
a signature database for storing signature profiles identifying patterns associated with network intrusions; and
a detection engine operable to perform a table lookup at the flow table to select an action to be performed on said classified packets based on the classification, wherein comparing said classified packets to at least a subset of the signature profiles is one of the actions;
wherein classifying said packets according to at least one packet field during the first classification stage comprises classifying said packets according to at least one of a destination address, a protocol type, and a destination port number;
wherein the second classification stage remains in communication with the flow table for identifying the action to be performed on said classified packets;
wherein the action includes dropping at least one of said classified packets and updating one or more fields in the flow table;
wherein the first classification stage precedes the second classification stage.

16. The system of claim 15 further comprising a data monitoring device having a capture engine operable to capture data passing through the network and configured to monitor network traffic, decode protocols, and analyze received data.

17. The system of claim 16 further comprising application program interfaces configured to allow the intrusion detection system access to applications of the data monitoring device to perform intrusion detection.

18. The system of claim 16 further comprising a parser operable to parse, generate, and load signatures at the detection engine.

19. The system of claim 16 further comprising an alarm manager operable to generate alarms.

20. The system of claim 16 further comprising a filter configured to filter out packets received at the intrusion detection system.

21. The system of claim 16 further comprising a capture engine configured to forward packets and temporarily store packets for later analysis by the data monitoring device.

22. The system of claim 15 wherein the flow table is a hash table.

23. The system of claim 15 wherein action options listed in the flow table include the dropping the at least one of said classified packets and generating an alarm.

24. The system of claim 23 wherein the action options further include the dropping the at least one of said classified packets and the updating the one or more fields of the flow table.

25. A computer program product embodied on a tangible computer readable medium for detecting intrusions on a network, comprising:
code that stores signature profiles identifying patterns associated with network intrusions in a signature database;
code that generates classification rules based on said signature profiles;
code that receives data packets transmitted on the network;
code that classifies data packets having corresponding classification rules according to said generated classification rules;
code that forwards said classified packets to a signature engine for comparison with signature profiles and stores signature profiles identifying patterns associated with network intrusions in a signature database; and
code that performs a table lookup to select an action to be performed on said classified packets based on the classification;
wherein the classification is carried out by a first classification stage capable of classifying the data packets based on a first set of packet characteristics, and a second classification stage capable of classifying the data packets received from the first classification stage based on a second set of packet characteristics;
wherein one of the actions is comparing said classified packets to at least a subset of the signature profiles;
wherein the first set of packet characteristics on which the classification of the first classification stage is based includes at least one of a destination address, a protocol type, and a destination port number;
wherein the second set of packet characteristics on which the classification of the second classification stage is based includes at least one of a packet type and a size,
wherein classifying said data packets comprises classifying said data packets according to at least one packet field into groups, and classifying said data packets within each of the groups according to TCP flags;
wherein the second classification stare remains in communication with a flow table for identifying an action to be taken with respect to the data packets;
wherein the action identified utilizing the flow table includes dropping at least one of the data packets and updating one or more fields in the flow table;

wherein the first classification stage precedes the second classification stage.

26. The method of claim 1, wherein the first set of packet characteristics includes the destination address, the protocol type, and the destination port number.

27. The method of claim 1, wherein the second set of packet characteristics includes the packet type and the size.

28. The method of claim 1, wherein the flow table is at least one hash table.

29. The method of claim 1, wherein the classification rules are generated after filtering the data packets.

30. The method of claim 27, wherein the packet type is determined based on a TCP flag.

31. The method of claim 1, wherein the signature engine uses a priority scheme to ensure that a subset of the signature profiles are compared with the classified packets based on a number of the data packets received.

32. The method of claim 1, wherein the action identified utilizing the flow table includes dropping all unclassified packets.

* * * * *

UNITED STATES PATENT AND TRADEMARK OFFICE
CERTIFICATE OF CORRECTION

PATENT NO. : 7,424,744 B1  Page 1 of 1
APPLICATION NO. : 10/092179
DATED : September 9, 2008
INVENTOR(S) : Wu et al.

It is certified that error appears in the above-identified patent and that said Letters Patent is hereby corrected as shown below:

In the claims:
Col. 8, line 59, replace "table:" with -- table; --;
Col. 10, line 57, replace "size" with -- size; --;
Col. 10, line 62, replace "stare" with -- stage --.

Signed and Sealed this

Ninth Day of November, 2010

David J. Kappos
*Director of the United States Patent and Trademark Office*